United States Patent [19]
Kief

[11] Patent Number: 5,179,848
[45] Date of Patent: Jan. 19, 1993

[54] LOCK HOLDING DEVICE

[76] Inventor: Thomas E. Kief, 320 Tuxedo La., Cary, Ill. 60013

[21] Appl. No.: 899,871

[22] Filed: Jun. 8, 1992

[51] Int. Cl.⁵ .............................................. E05B 67/38
[52] U.S. Cl. ........................................ 70/51; 70/233; 70/54; 224/39; 248/309.1
[58] Field of Search .............................. 70/51, 54–56, 70/466, 14, 18, 20, 233; 224/39; 248/309.1, 301, 303, 211

[56] References Cited

U.S. PATENT DOCUMENTS

| | | | |
|---|---|---|---|
| 1,402,725 | 1/1922 | Pippen | 70/227 |
| 2,706,901 | 4/1955 | Jenkins | 70/227 |
| 4,277,961 | 7/1981 | Williams | 70/54 |
| 4,436,232 | 3/1984 | Zane et al. | 70/233 |
| 4,788,836 | 12/1988 | Poe | 70/54 |
| 4,873,849 | 10/1989 | Goodson et al. | 70/54 |
| 5,127,562 | 7/1992 | Zane et al. | 70/233 |

FOREIGN PATENT DOCUMENTS 0049904  10/1981  European Pat. Off. .............. 70/233

OTHER PUBLICATIONS

Harley Davidson Product Publication: Custom Chrome ™, Morgan Hill, Calif., p. 16.
Hot Bike Publication, May 1972, pp. 20 48.
Motorcycle Product News, May 1992, p. 86.

Primary Examiner—Renee S. Luebke
Assistant Examiner—D. Boucher
Attorney, Agent, or Firm—Douglas B. White

[57] ABSTRACT

A lock holder device is presented for attaching padlocks (when not in use) to motorcycles, said device consisting of a lock engaging member and means for attaching it to a motorcycle. The lock holder member employs an upper section having shackle engaging symmetrical grooves along its sides, and a lower section having padlock body engaging lips extending downwardly therefrom.

1 Claim, 2 Drawing Sheets

LOCK HOLDING DEVICE

BACKGROUND OF THE INVENTION

1. Field of the Invention

The present invention relates generally to the area of lock holders, particularly lock holders whose function is to attach padlocks to motorcycles when the padlocks are not in use.

2. Description of the Prior Art

The need for this lock holder stems from the inability of existing lock holders to address all of the problems encountered with securing padlocks to motorcycles. The prior art has focused primarily on merely attaching a padlock to a motorcycle. Existing lock holders vary in shape, but have a common problem element, which is that they are only secured to a portion of the padlock, thus the padlock bounces around and makes very annoying noises when the bike is in motion.

SUMMARY OF THE INVENTION

It is the principal object of the present invention to improve the existing lock holders by stopping the movement of a padlock while it is attached to a lock holder on a motorcycle.

Generally there are provided two parts, a front lock engaging member and a rear lock engaging member and means for attaching the members to each other and to a motorcycle.

The front lock engaging member consists of a middle section; an upper section; a lower section; and a lip section. The middle section has a hole through which the means for attachment are placed. The upper section extends from the top of the middle section at a transverse angle, having symmetrical grooves along its sides for engaging the shackle portion of a padlock. The lower section extends transversely from the bottom of said middle section, with the lip section extending downward transversely from the end of the lower section. The lip section functions to engage the body portion of a padlock.

The rear lock engaging member consists of: a rectangular shaped section which has a hole therein, through which the means for attachment are placed; and a lip section formed by an extension of its lower end.

The rear lock engaging member is placed behind and parallel to the front lock engaging member, the members are secured to one another, and then they are secured to a motorcycle. The shackle portion of a padlock is placed over the upper section, the body portion of the padlock to be secured between the lip section of the front lock engaging member and the lip section of the rear lock engaging member when the padlock is closed.

In the alternative, the front lock engaging member may be formed so that it has a second lip section and thus the lock holder device would consist of one member and means for attachment as the rear lock engaging member would not be necessary.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT

Figure 1:
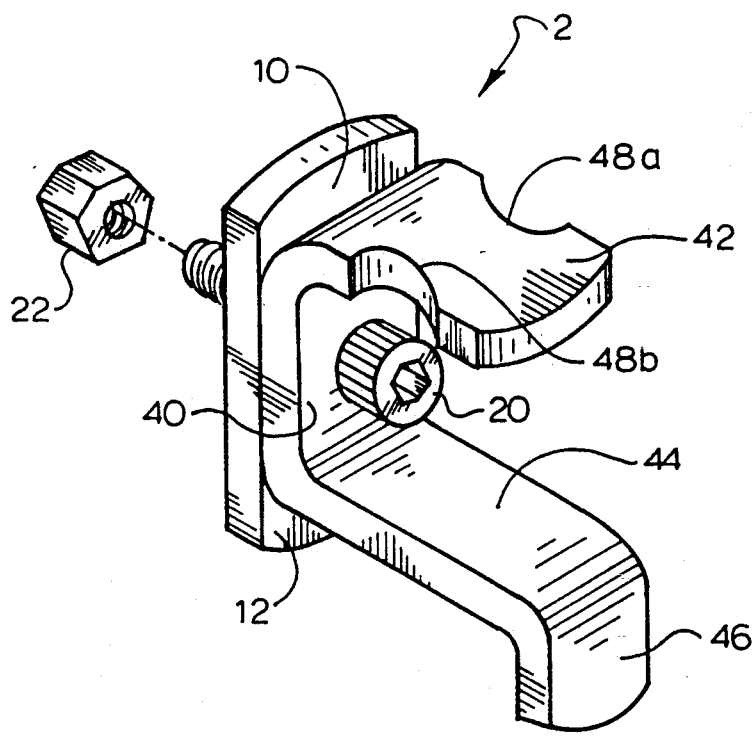
FIG. 1 is a perspective view of the preferred embodiment of the lock holder device of the present invention.
Figure 2:
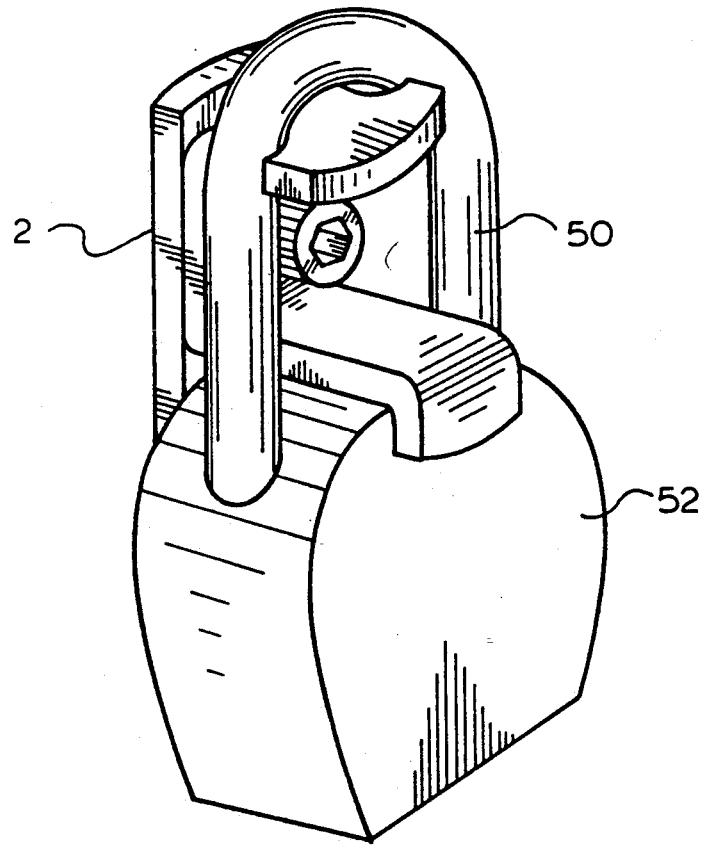
FIG. 2 is a perspective frontal view of the preferred embodiment of the lock holder device with a padlock having a shackle and body portion attached thereto.
Figure 3:
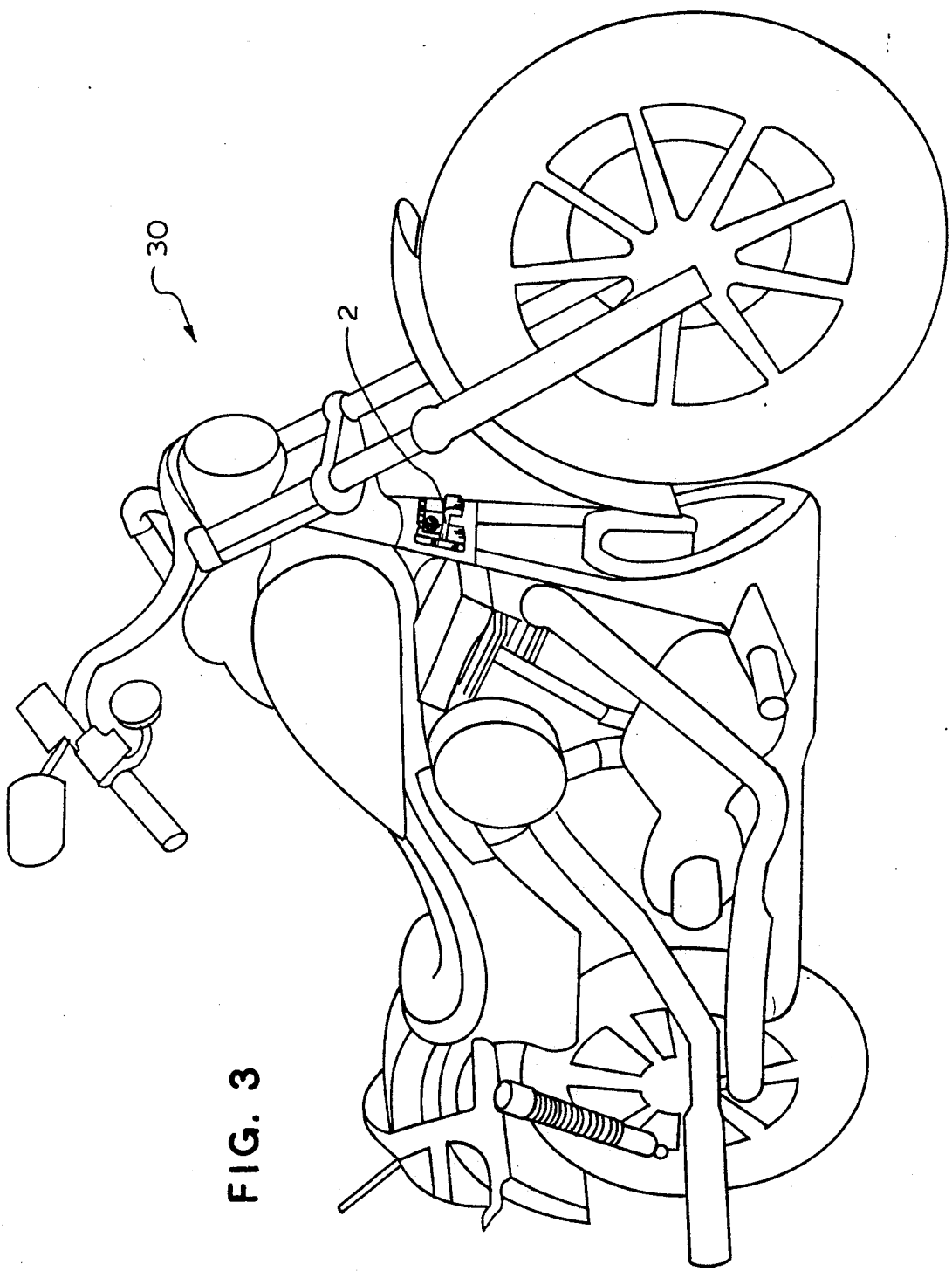
FIG. 3 is a perspective view of the preferred embodiment of the lock holder device attached to a motorcycle.

Turning first to FIG. 1 there is shown a lock holder device 2 in accordance with the present invention. Generally this device 2 consists of a front lock engaging member, a rear lock engaging member and means for attaching the members to each other and to a motorcycle.

The rear lock engaging member 10 is generally rectangular in shape with a hole therein, having a lip 12 projecting downwardly therefrom. Means for attachment 20, and 22 secure the rear lock engaging member 10 and front lock engaging member to each other and to a motorcycle 30. Alternatively, the downwardly projecting lip may be incorporated onto the front lock engaging member.

The front lock engaging member has a middle section 40, an upper section 42, a lower section 44, and a lip section 46. The upper section 42 extends transversely from the top of the middle section 40, and exhibits symmetrical grooves 48a and 48b, along its sides for engaging the shackle portion 50. The lower section 44 extends transversely from the bottom of the middle section 40 and a lip section 46 extends transversely down from the lower section's front end for engaging the body portion 52 of the padlock.

In usage the rear lock engaging member 10 is placed parallel to and behind the front lock engaging middle section 40, and the attachment bolt 20 is placed through the holes in both members, passed through a hole on the motorcycle 30, and secured with nut 22. To attach the padlock the shackle portion 48 is placed over the front lock engaging member upper section 42, within the symmetrical grooves 48a and 48b, and the body portion 52 of the lock is positioned between the lip sections 46 and 12. When the shackle is closed, the lock is fixed securely (and quietly).

From the foregoing description, it will be apparent that modifications can be made to the apparatus and method for using same without departing from the teachings of the present invention. Accordingly, the scope of the invention is only to be limited as necessitated by the accompanying claims.

I claim:

1. A lock holder device for attaching padlocks having a shackle and a body portion to motorcycles while the locks are not in use, said lock holder comprising:

a first lock engaging member comprising a middle section having a hole therein, an upper section having sides defined thereon, and a lower section, wherein said upper section extends at a transverse angle from said middle section and has symmetrical grooves on said sides thereof for engaging the shackle of the padlock, and wherein said lower section extends at a transverse angle from said middle section and has a lip thereon extending downwardly from said lower section at a transverse angle for securing the body portion of the padlock;

a second lock engaging member having a hole therein for securing said second lock engaging member to said first lock engaging member and to a motorcycle, and having a lip extending downwardly therefrom as an extension of said second lock engaging member for securing the body portion of the padlock; and fastening means for securing said first lock engaging member and said second lock engaging member to each other and to a motorcycle.

* * * * *